May 24, 1938.  F. BULLIS  2,118,394
STEERING COLUMN LOCK
Filed March 18, 1935  2 Sheets-Sheet 1
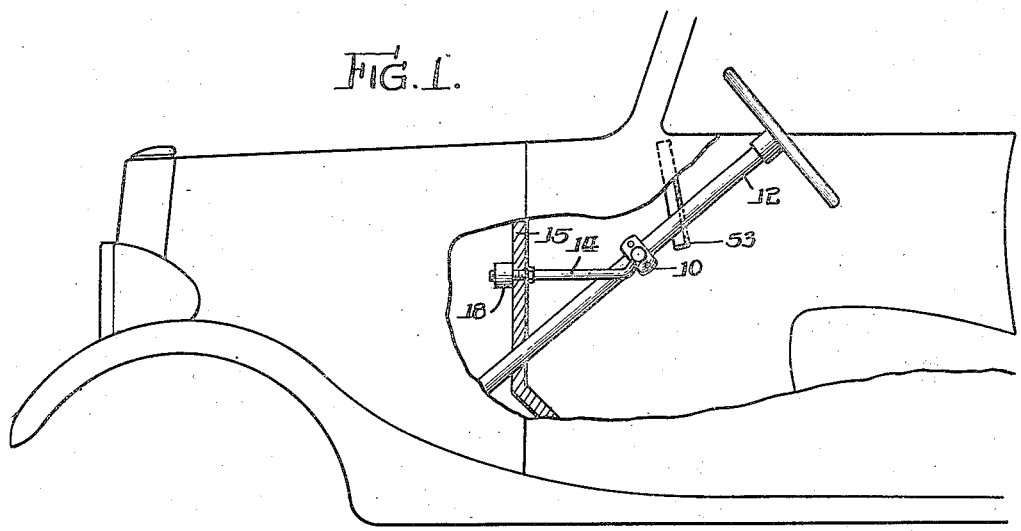
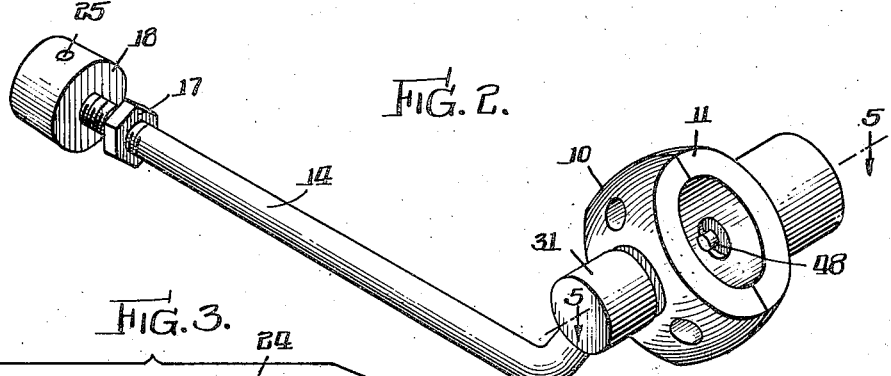
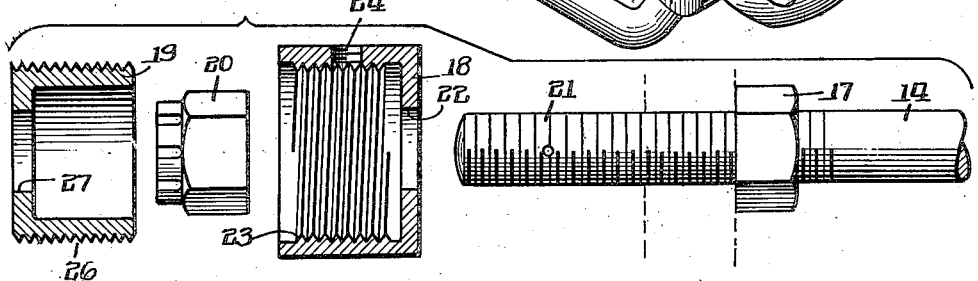
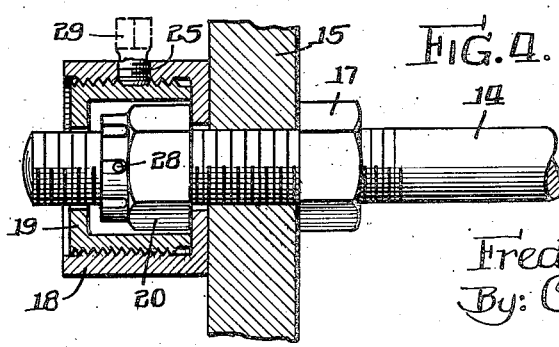
Inventor:
Frederick Bullis,
By: Cox & Moore
attys.

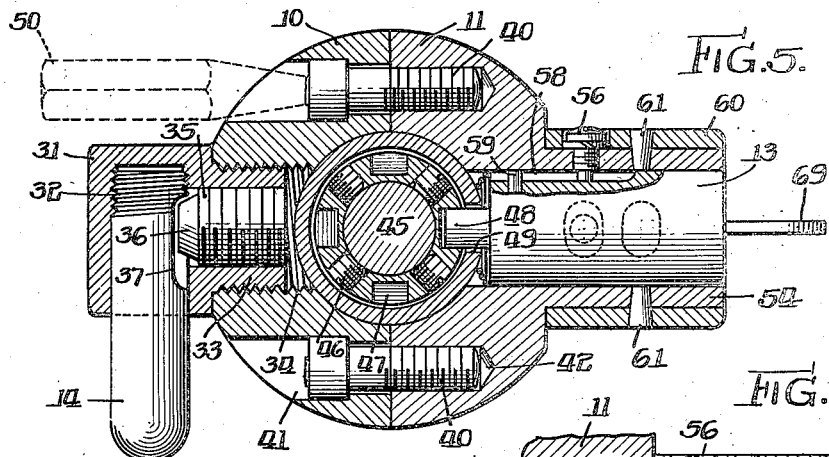
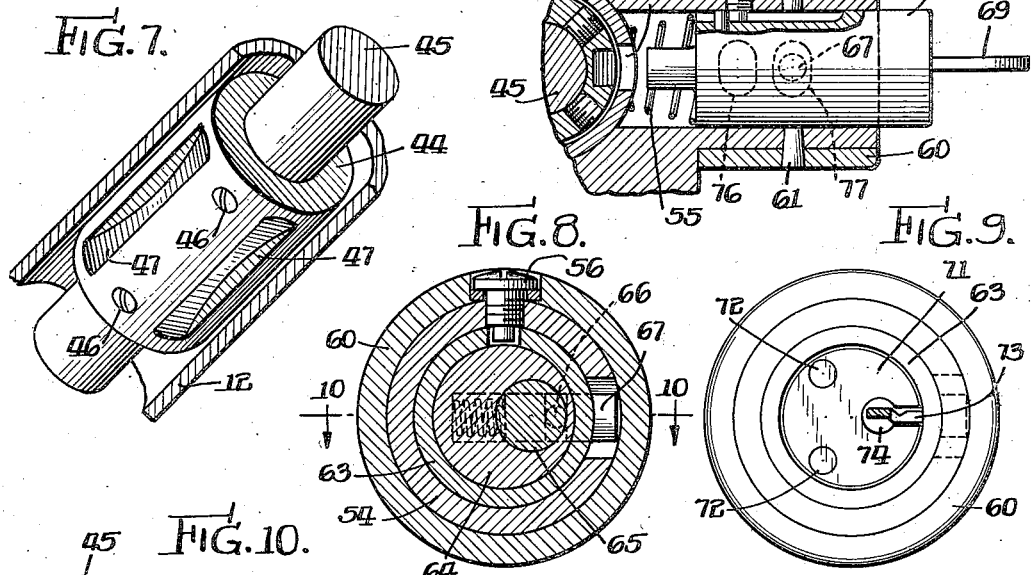
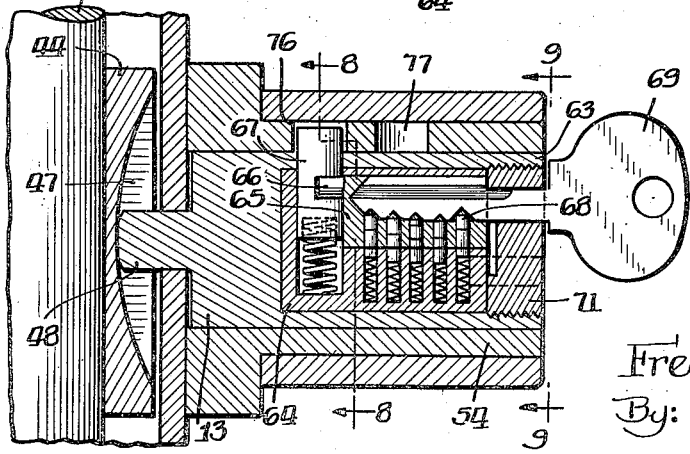

Patented May 24, 1938

2,118,394

UNITED STATES PATENT OFFICE 2,118,394

STEERING COLUMN LOCK

Frederick Bullis, Chicago, Ill.

Application March 18, 1935, Serial No. 11,585

8 Claims. (Cl. 70—451)

This invention relates to locking devices and more particularly to locks for the steering gear of automotive vehicles.

It is an object of the invention to provide a lock device which may be easily and cheaply constructed of a minimum number of parts, and which can be readily adapted to any type of vehicle steering column and readily applied thereto.

Further objects of the invention are to provide a lock device which is strong and difficult to pick or break, which may be secured to a substantial and solid part of the vehicle, and in which the locking unit may be readily replaced by authorized persons as occasion may require.

Still further objects of the invention are to provide a lock assembly which is anchored to the dashboard of an automotive vehicle in a non-removable manner, which surrounds and protects the steering post parts with which it cooperates, and in which the locking mechanism is relatively inaccessible for picking.

Other objects and advantages of the invention will be apparent from the following description of certain preferred embodiments thereof when taken in connection with the accompanying drawings.

In the drawings wherein like reference numerals refer to like parts throughout,

Fig. 1 is a partial side view of an automotive vehicle having the invention applied thereto, certain parts being broken away to show the manner of application.

Fig. 2 is a perspective view of the locking assembly of the invention, on an enlarged scale.

Fig. 3 is an exploded view showing the parts by which the assembly is secured to the vehicle dashboard.

Fig. 4 is a view showing the parts of Fig. 3 in assembled relation.

Fig. 5 is a sectional view through the lock assembly body, taken substantially along the line 5—5 of Fig. 2, and showing the body operatively associated with the steering column.

Fig. 6 is a partial sectional view of the parts of Fig. 5, but showing the locking bolt withdrawn.

Fig. 7 is a perspective broken view of the locking portion of the steering column.

Fig. 8 is a transverse sectional view through the lock assembly body and locking bolt, taken substantially along the line 8—8 of Fig. 10.

Fig. 9 is a view of these parts taken along the line 9—9 of Fig. 10.

Fig. 10 is a longitudinal section through the body and bolt showing the lock mechanism, taken substantially along the line 10—10 of Fig. 8, and Fig. 11 is a detail view of the key.

In the drawings, the lock of the invention is shown applied to the steering post of an automotive vehicle as it is particularly adapted for use therewith. However, it is not restricted to such use, but may be applied to the manipulative levers of various devices, and the several features thereof may be incorporated in any locking arrangement wherein the objects and advantages set forth above may be desired.

Referring to the drawings, the embodiment of the invention shown for purposes of illustration comprises a lock assembly having co-operating and complementary body portions 10 and 11 adapted to securely embrace the outer stationary sleeve 12 of the steering column of the automotive vehicle. The body portion 11 carries the locking bolt 13 and the body portion 10 carries the anchor rod 14 which is secured at one end within the body portion 10 and at the opposite end to the dashboard 15 of the vehicle.

The means by which the anchor rod is secured to the dash is best shown in Figs. 1, 2, 3 and 4. This means comprises a nut 17, a protecting collar 18, a collar cap 19 and a second nut 20, preferably a castellated nut. The anchor rod 14 is threaded at 21 at its end, and the nut 17 is adapted for threaded engagement with the threads 21, as shown. The protecting collar 18 has an opening 22 by means of which it may be passed along the rod, and is internally threaded at 23. The protecting collar also has a threaded opening 24 adapted to receive a threaded break-off stud 25. The collar cap 19 is externally threaded at 26 for engagement with the internal threads of the protecting collar, and has an opening 27 formed therethrough by means of which it also may be passed along the anchor rod. The castle nut 20 is also adapted for threaded engagement upon the threaded end 21 of the anchor rod.

In securing the end of the anchor rod 14 to the dash 15 of the vehicle the nut 17 is first threaded upon the rod, being initially threaded along the rod substantially to the right hand end of the thread 21, as shown in Fig. 3. The rod end is then inserted through a suitable opening in the dash and the protecting collar is then placed over the end of the rod, as indicated in Fig. 3, after which the castle nut 20 is threaded upon the rod into position, as shown in Fig. 4. The nut may be secured in position by a suitable cotter pin 28 if desired, or friction alone may be relied upon to hold it in position. The collar cap 19 is then slipped over the end of the rod and threaded within the protecting collar, as shown in Fig. 4. The cap 19 is so proportioned that it may be threaded loosely into the protecting collar 18 without the use of a wrench or like implement. The break-off screw 25 is then threaded into opening 24 of the protecting collar, into tight engagement with the external threads upon the collar cap, after which the end 29 of the break-off screw by which it is threaded into position may be broken off and discarded. The nut 17 is now reversely threaded to the left along the rod to clamp the parts tightly to the dash 15. It will be seen that the protecting collar 18 and the collar cap 19 provide an encasement for the castle nut 20, rendering the nut wholly inaccessible so that it cannot be removed from the anchor rod. The collar cap cannot be withdrawn from the protecting collar by reason of the engagement of the break-off screw 25 with the external threads of the collar cap. The break-off screw cannot be removed as its operating portion 29 has been broken off. However, even if the screw 25 could be removed the external threads of the collar cap would be mutilated so that the cap could not be withdrawn from the protecting collar. The nut 17 may be loosened, but inasmuch as the castle nut 20 cannot be removed, the anchor rod 14 remains connected to the dash 15, so that it cannot be removed therefrom. A permanent, tamper-proof, and strong connection is thus insured.

Rod 14 is connected at its rear or steering post end to the body portion 10 of the assembly, by means of a hub member 31, as best shown in Figs. 1, 2 and 5. The hub 31 has a bore for receiving the end of the rod, and in the embodiment shown the bore is threaded for screw threaded engagement with threads 32 formed on the end of the rod. The hub 31 has a cylindrical extending portion 33 threaded exteriorly for engagement with a threaded bore 34 formed in the body portion 10, and threaded interiorly for the reception of a threaded plug 35. The plug 35 has an extending portion 36 which is adapted to extend into a cut away or flat spot portion 37 formed near the end of the rod 14.

The body portions 10 and 11 are secured together by means of headed break-off studs 40 which are seated in openings 41 formed in the body portion 10 and have threaded engagement with threaded openings 42 formed in the body portion 11. The co-operating portions of the body tightly embrace the stationary outer sleeve 12 of the steering column, and within the sleeve at the point where the body portions 10 and 11 are affixed thereto is a steering post locking sleeve 44 fixed to the rotatable steering post 45 by means of set screws 46. The locking sleeve has formed therein a plurality of locking slots 47, into which the projecting end 48 of the locking bolt 13 is adapted to project to lock the steering post from movement. The sleeve 12 is cut away at 49 to accommodate the end of the locking bolt.

In assembling the body sections 10 and 11 upon the steering column and in securing the rod 14 thereto, the rod may be first threaded within the hub 31. The body section 10 may then be threaded upon the hub, after which the plug 35 can be threaded into the hub until its projection 36 extends into the flattened portion 37 of the rod 14. The plug 35 may be threaded into position by means of a suitable break-off operating section which can be broken off after the plug is in position, in a manner similar to that described with reference to the manner of application of break-off screw 25 for the protecting collar 18. Friction of the threads is sufficient to hold plug 36 in position within the hub 31 or the threads can be mutilated to lock the parts. The body portions 10 and 11 may now be fitted around the steering column sleeve 12, the locking sleeve 44 having been first located upon the rotatable steering post 45 and secured thereto by means of screws 46 at the point within the sleeve or column 12 which is to be embraced by the body sections. The body sections are then secured by the studs 40, the break-off operation sections 50 of the studs being broken off and removed after the studs are threaded into position. Friction of the stud threads will be sufficient to hold the studs in place, and they cannot be removed as they are inaccessible.

The body portions 10 and 11 are therefore permanently secured to the steering column sleeve 12, and the locking sleeve 44 is inaccessible to tampering unless the entire steering post 45 is displaced longitudinally, inasmuch as the locking sleeve 44 is surrounded and protected by the body portions 10 and 11. The plug 35 is inaccessible and hence cannot be removed, and its projection 36 insures that the rod 14 cannot be removed from the hub 31. The hub 31 cannot be removed from body portion 10 because relative rotation between these parts is prevented by their engagement with the steering post and the rod 14, which is secured to the dash 15 of the vehicle. There is sufficient play between projection 36 and flat spot 37 to facilitate application and adjustment of the parts.

The rod 14 is made of hard alloy steel which resists efforts to break or saw it. The rod 14 is generally inaccessible to tampering in that it is beneath the instrument panel 52 of the vehicle, and it is anchored to the dashboard 15 which is of heavy construction, considerably heavier than the panel 52 to which conventional steering post locks are frequently anchored. The lock is adaptable to substantially any vehicle in that the body portions 10 and 11 may be secured to the steering post at any convenient position therealong, and the rod 14 may be secured to the dash 15 at any convenient position. The rod 14 may be formed of any shape and length suitable to the requirements of the installation, the lock of the invention being thereby adaptable for ready installation upon various types of automotive vehicles.

The locking bolt 13 is slidable within a bore formed in the cylindrical portion 54 of the body 11, and is normally urged to a position out of engagement with the locking sleeve 44, to the position of Fig. 6, by the compression spring 55. Sliding movement of the bolt is permitted, but rotation thereof within the body section 11 is prevented by means of a screw 56 threaded into the portion 54 of the body, and having its projecting end engageable within a slot 58 formed longitudinally of the locking bolt. A stop pin 59 carried by the bolt projects into the slot and limits outward movement of the bolt by its engagement with screw 56, as shown in Fig. 6. The screw 56 is seated within a collar 60 surrounding body portion 54 and permanently pinned thereto by means of tapered pins 61, which may be pressed into position and then filed off.

As best shown in Figs. 8, 9, and 10, locking bolt 13 comprises an outer hollow cylindrical portion 63, an intermediate barrel 64 fixed therein, and a key receiving lock barrel 65 rotatably carried within the intermediate barrel. The lock barrel carries an operating projection 66 for operating the spring pressed lock element 67, and the lock barrel and intermediate barrel carry the spring pressed tumblers 68, the lock barrel being rotatable within the intermediate barrel to project or withdraw the lock element 67 only when the pin tumblers are positioned in their proper positions at the line of juncture between the lock and intermediate barrels by the key 69, all as well understood in the lock art.

Threaded into the portion 63 of the bolt is a plug 71 which lies in front of and protects the intermediate barrel 64 and the lock barrel 65. The plug 71 is pinned to the non-rotatable intermediate barrel 64 by means of tapered pins 72 which are driven into position and then filed off, thereby permanently securing the plug and the intermediate barrel together. The key 69 is cut away at 73 so as to permit rotation and operation of the key within the keyway 74 provided in the plug. The provision of plug 71 constitutes an important feature of the invention. It renders the pin tumblers more inaccessible for picking and, inasmuch as it remains non-rotatable as the lock barrel 65 and pin tumblers are rotated to operate the lock, the pin tumblers are rendered difficult for picking or for manipulation by means other than a key of proper character.

The lock element 67 is adapted to engage within opening 76 in the body portion 54 when the projection 48 engages within the slot 47 of the locking sleeve, and within opening 77 when the locking bolt is withdrawn to inoperative or non-locking position. By removal of screw 56 and withdrawal of lock element 67, the entire locking bolt assembly may be withdrawn from the body 11. The locking bolt is therefore readily replaceable as a unit by authorized persons having the proper key, but it cannot be withdrawn without first unlocking it.

It will be seen that by the invention there is produced a lock assembly which is difficult to pick, and which is strong, and securely and permanently anchored to a rigid part of the vehicle. It is adaptable to various vehicles and is easily installed, and its locking bolt or unit may be readily replaced by authorized persons.

It is to be understood that a number of changes may be made in the embodiments of the invention used for purposes of illustration without departing from the spirit of the invention. The invention contemplates the use of equivalents throughout and, accordingly, I do not wish to be limited to the precise embodiments shown and described but only as indicated in the following claims.

I claim:

1. In a steering column lock assembly for vehicles, a securing means for a steering column lock body adapted to be secured to a steering column comprising a rod, means for anchoring one end of the rod to a stationary vehicle part, and means for securing the other end of the rod to the lock body, said last named securing means comprising a hub threaded into the lock body, said rod being secured to said hub but being provided as an element separate therefrom.

2. In a steering column lock assembly for vehicles, a securing means for a steering column lock body adapted to be secured to a steering column comprising an anchor rod, means for anchoring one end of the rod to a stationary vehicle part, and means for securing the other end of the rod to the lock body, said last named securing means comprising a hub, means for threading the hub into the lock body, said hub having means for receiving the end of the rod therein, and a plug threadable into the hub through the body member and engageable with the rod to hold the rod within the hub.

3. In a steering column lock assembly for vehicles, a securing means for a steering column lock body adapted to be secured to a steering column comprising an anchor rod, means for anchoring one end of the rod to a stationary vehicle part, and means for securing the other end of the rod to the lock body comprising a hub threaded into the lock body, said hub having an opening for receiving an end of the rod, and said rod having a depressed portion adjacent its end, and a plug secured within the hub and having a portion engageable with the depressed portion of the rod.

4. In a steering column lock assembly for vehicles, a securing means for a steering column lock body adapted to be secured to a steering column comprising projecting means secured to the body but provided as an element separate therefrom, and means for anchoring the projecting means to a stationary part of the vehicle, said anchoring means comprising a member threaded to the projecting means and means to lock said member thereon.

5. In a steering post lock assembly for automotive vehicles, a securing means for a steering post lock body adapted to be secured to a steering post comprising an anchor rod rigidly extending from said body, and means for anchoring the rod end to a stationary vehicle part, said anchoring means comprising a nut threaded upon the rod, and means for locking the nut to the rod to prevent removal therefrom.

6. In a steering post lock assembly for automotive vehicles, a securing means for a steering post lock body adapted to be secured to a steering post comprising an anchor rod rigidly extending from said body but provided as an element separate therefrom, and means for anchoring the rod end to a stationary vehicle part comprising a nut threaded upon the rod, a pair of engageable cup members loosely fitted upon the rod and enclosing the nut, and means for preventing separation of said cup members comprising a threaded engagement therebetween.

7. A lock as defined in claim 6 in which one of said cup members has an opening through which the threads comprising the threaded engagement means may be mutilated after the cup members are secured together.

8. In a steering column lock assembly for vehicles having a dashboard, a securing means for a steering column lock body adapted to be secured to a steering column comprising an anchoring rod, means for securing the rod to the vehicle dashboard, and means for securing the rod to said body, said last named means comprising interengageable members on the rod and on the body which members are immovable when the parts are in assembled relation.

FREDERICK BULLIS.